United States Patent
Nakasato et al.

(12) 
(10) Patent No.: US 11,427,031 B2
(45) Date of Patent: Aug. 30, 2022

(54) HEAVY DUTY TIRE

(71) Applicant: BRIDGESTONE CORPORATION, Tokyo (JP)

(72) Inventors: Reo Nakasato, Tokyo (JP); Taiki Sato, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 211 days.

(21) Appl. No.: 16/770,060

(22) PCT Filed: Jul. 19, 2018

(86) PCT No.: PCT/JP2018/027135
§ 371 (c)(1),
(2) Date: Jun. 4, 2020

(87) PCT Pub. No.: WO2019/116622
PCT Pub. Date: Jun. 20, 2019

(65) Prior Publication Data
US 2021/0213782 A1    Jul. 15, 2021

(30) Foreign Application Priority Data
Dec. 12, 2017  (JP) .............................. JP2017-237698

(51) Int. Cl.
*B60C 11/01* (2006.01)
*B60C 9/18* (2006.01)

(52) U.S. Cl.
CPC ............... *B60C 9/18* (2013.01); *B60C 11/01* (2013.01); *B60C 2011/013* (2013.01); *B60C 2200/06* (2013.01)

(58) Field of Classification Search
CPC ........................... B60C 11/01; B60C 2011/013
See application file for complete search history.

(56) References Cited

U.S. PATENT DOCUMENTS

| 2,760,541 A | 8/1956 | Reifenberger et al. |
| 2,972,368 A | 2/1961 | Williams |
| | (Continued) | |

FOREIGN PATENT DOCUMENTS

| CN | 2771008 Y | 4/2006 |
| CN | 101722796 A | 6/2010 |
| | (Continued) | |

OTHER PUBLICATIONS

Machine Translation: JP-2004066851-A, Yamada S, (Year: 2022).*
(Continued)

*Primary Examiner* — Kendra Ly
(74) *Attorney, Agent, or Firm* — Solaris Intellectual Property Group, PLLC

(57) ABSTRACT

A heavy duty tire 10 includes a recess portion 34, a circumference-direction air entry and exit promotion portion 36 and an air-catching wall portion 42. The recess portion 34 is formed in a buttress portion 26 and opens to a tire outer side. The circumference-direction air entry and exit promotion portion 36 is disposed at one side of a floor portion 40 in a tire rotation direction and includes a slope 46 that, from the floor portion 40 toward a tire surface, gradually decreases in depth from the tire surface. The circumference-direction air entry and exit promotion portion 36 facilitates access of air toward the floor portion. The air-catching wall portion 42 is disposed at the opposite side of the floor portion 40 from the circumference-direction air entry and exit promotion portion 36. The air-catching wall portion 42 has a greater angle relative to the tire surface than the slope.

10 Claims, 7 Drawing Sheets

(56) References Cited

U.S. PATENT DOCUMENTS

| | | | |
|---|---|---|---|
| 4,702,292 A | 10/1987 | Brayer | |
| 2011/0290388 A1 | 12/2011 | Radulescu | |
| 2012/0060994 A1* | 3/2012 | Hayashi | B60C 13/02 |
| | | | 152/523 |
| 2016/0200148 A1 | 7/2016 | Nomura | |
| 2018/0056730 A1 | 3/2018 | Yamaguchi | |

FOREIGN PATENT DOCUMENTS

| | | |
|---|---|---|
| CN | 105473347 A | 4/2016 |
| CN | 106585286 A | 4/2017 |
| EP | 486274 A2 | 5/1992 |
| EP | 3196054 A1 | 7/2017 |
| JP | H02-99408 A | 4/1990 |
| JP | 2000-043508 A | 2/2000 |
| JP | 2000-103206 A | 4/2000 |
| JP | 2000-108614 A | 4/2000 |
| JP | 2004-009886 A | 1/2004 |
| JP | 2004-66851 A | 3/2004 |
| JP | 2004066851 A * | 3/2004 |
| JP | 2005-081919 A | 3/2005 |
| JP | 2007-091155 A | 4/2007 |
| JP | 2007-203964 A | 8/2007 |
| JP | 2009-542528 A | 12/2009 |
| JP | 1381156 S | 3/2010 |
| JP | 2010-132045 A | 6/2010 |
| JP | 2010-280322 A | 12/2010 |
| JP | 2010-280327 A | 12/2010 |
| JP | 2012-056326 A | 3/2012 |
| JP | 5129855 B2 | 1/2013 |
| JP | 2016-175459 A | 10/2016 |
| JP | 2017-19483 A | 1/2017 |

OTHER PUBLICATIONS

International Search Report issued in International Application No. PCT/JP2018/027135 dated Oct. 16, 2018.

Search Report of the Chinese office action dated Sep. 14, 2021, from the SIPO in a Chinese patent application 2018800798499 corresponding to the instant patent application.

Extended European Search Report dated Jul. 26, 2021, issued in corresponding EP Patent Application No. 18888100.7.

* cited by examiner

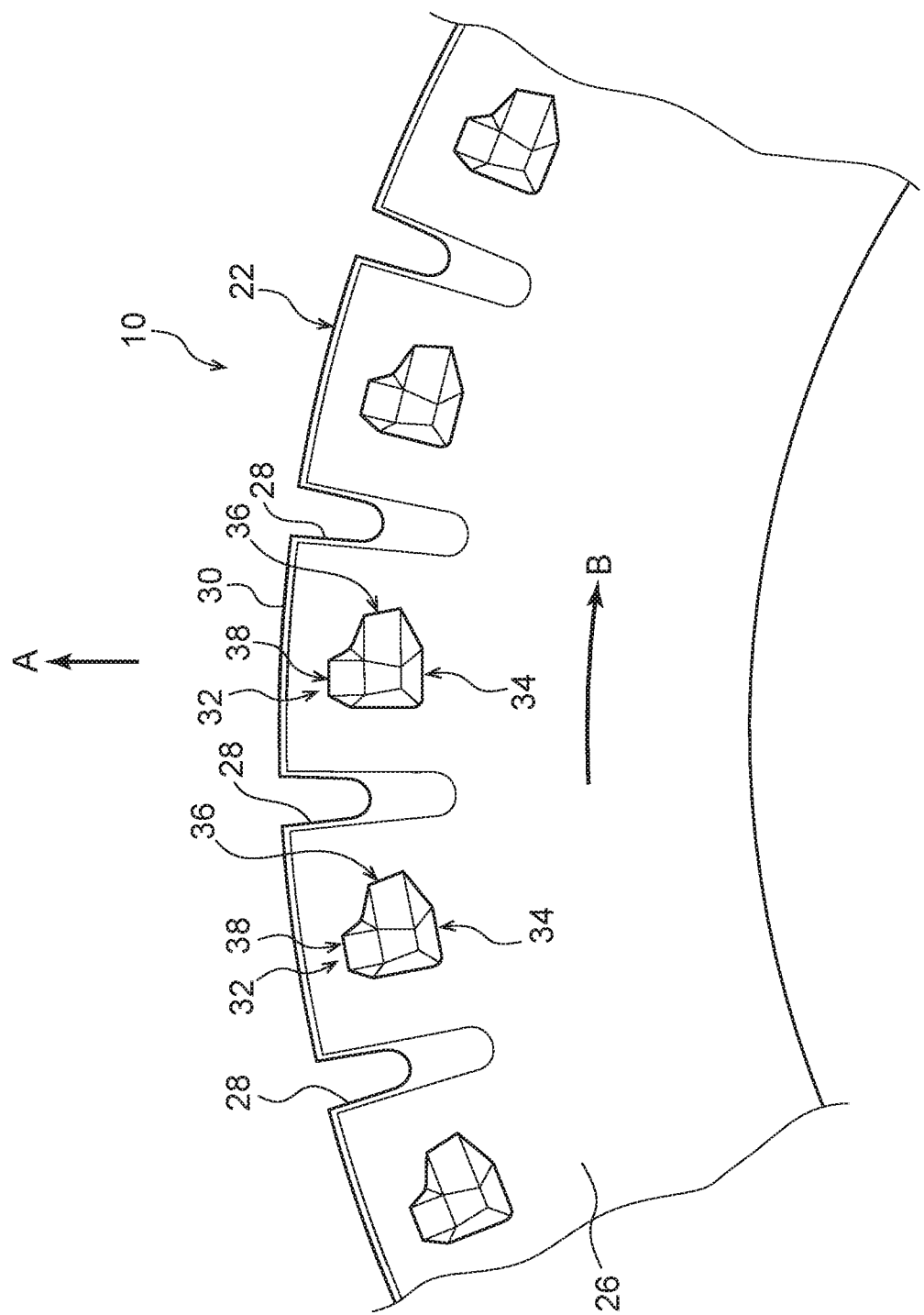

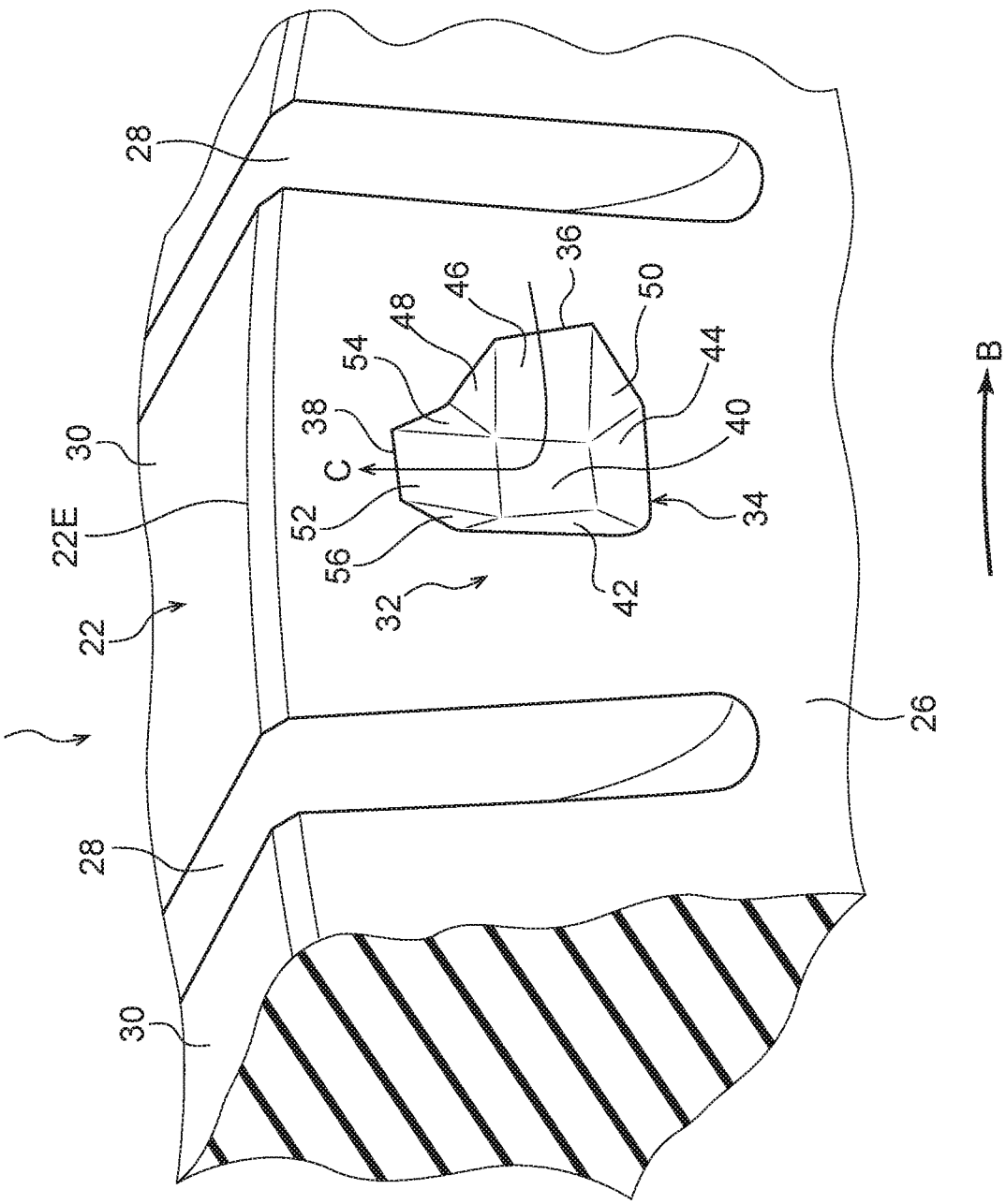

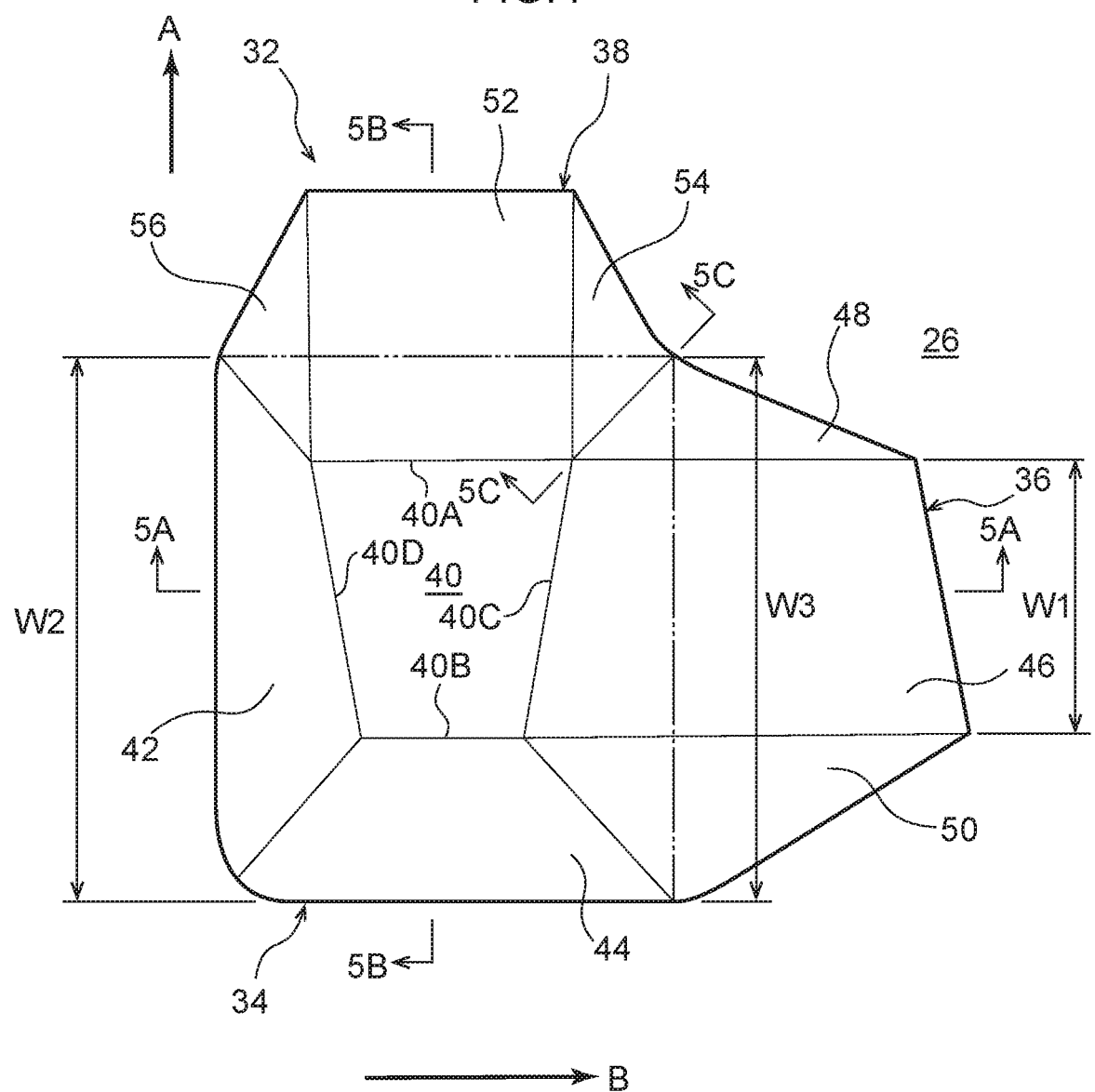

HEAVY DUTY TIRE

TECHNICAL FIELD

The present invention relates to a heavy duty tire.

BACKGROUND ART

In light of load-bearing capacity, size and the like of a heavy duty tire, temperatures tend to be higher in vicinities of buttress portions. When a tire repeatedly makes contact with and separates from a road surface due to running, each buttress portion warps repeatedly and generates heat. Accordingly, forming recess portions in a buttress portion and allowing air to flow in the recess portions to cool the buttress portion can be considered. Tires in which recess portions are formed in a buttress portion include, for example, the tire recited in Japanese Patent Application National Publication No. 2009-542528.

SUMMARY OF INVENTION

Technical Problem

When recess portions are formed in a buttress portion, cooling of the buttress portion to some extent is enabled. However, when a carried load is large, warping increases and heat generation increases. Consequently, improvements in cooling performance are called for.

In consideration of the circumstances described above, an object of the present invention is to provide a heavy duty tire that improves cooling performance of a buttress portion.

Solution to Problem

A heavy duty tire according to a first aspect includes: a recess portion formed in a buttress portion, the recess portion opening to a tire outer side and including a floor portion; a circumference-direction air entry and exit promotion portion disposed at one side in a tire rotation direction relative to the floor portion, the circumference-direction air entry and exit promotion portion including a slope that, from the floor portion toward a tire surface, gradually decreases in depth from the tire surface, and the circumference-direction air entry and exit promotion portion facilitating access of air toward the floor portion; and an air-catching wall portion disposed at an opposite side of the floor portion from the one side at which the circumference-direction air entry and exit promotion portion is disposed, an angle of the air-catching wall portion relative to the tire surface being greater than a corresponding angle of the slope.

When this heavy duty tire rotates, a speed difference occurs between the tire surface and the surrounding air, and air flows into the recess portion formed in the buttress portion. In the heavy duty tire according to the first aspect, the circumference-direction air entry and exit promotion portion is formed at the one side in the tire rotation direction relative to the floor portion of the recess portion. The circumference-direction air entry and exit promotion portion includes the slope that gradually decreases in depth from the tire surface, and facilitates access of air toward the floor portion. Therefore, air easily passes along the slope in the tire rotation direction to access the floor portion.

The air-catching wall portion is formed at the opposite side of the floor portion from the circumference-direction air entry and exit promotion portion. Because the air-catching wall portion is at a greater angle relative to the tire surface than the slope, turbulence may be formed in air flowing thereto from the circumference-direction air entry and exit promotion portion. Therefore, a case of air that flows from the circumference-direction air entry and exit promotion portion only passing along the surface (in a shallow region) without reaching the floor of the recess portion may be suppressed, and trapping of air at the floor portion of the recess portion may be suppressed. As a result, an effect of cooling the floor portion of the recess portion may be improved. Thus, because this recess portion is provided in the buttress portion, the buttress portion may be effectively cooled while the heavy duty tire is rotating.

In a heavy duty tire according to a second aspect, in the heavy duty tire according to the first aspect, the circumference-direction air entry and exit promotion portion is disposed at a front side in the tire rotation direction.

According to the heavy duty tire according to the second aspect, while the tire is rotating, flows of air through the circumference-direction air entry and exit promotion portion to the floor portion are facilitated effectively.

In a heavy duty tire according to a third aspect, the heavy duty tire according to the first aspect or the second aspect further includes a second air entry and exit promotion portion disposed at a different location from the circumference-direction air entry and exit promotion portion, the second air entry and exit promotion portion including a slope that, from the floor portion toward the tire surface, gradually decreases in depth from the tire surface, and an angle of the slope of the second air entry and exit promotion portion relative to the tire surface being smaller than a corresponding angle of the air-catching wall portion.

According to the heavy duty tire according to the third aspect, the heavy duty tire includes the second air entry and exit promotion portion separately from the circumference-direction air entry and exit promotion portion. Therefore, for example, air flowing from the circumference-direction air entry and exit promotion portion passes along the floor portion, comes up against the air-catching wall portion, and then may escape out of the recess portion through the second air entry and exit promotion portion. Thus, flows of air into the recess portion may be further facilitated.

In a heavy duty tire according to a fourth aspect, in the heavy duty tire according to the third aspect, the second air entry and exit promotion portion is a diameter-direction air entry and exit promotion portion that is disposed at least at one side in a tire diameter direction relative to the floor portion.

Thus, the second air entry and exit promotion portion is disposed at a tire diameter direction side relative to the floor portion. Therefore, the direction of air flowing from the circumference-direction air entry and exit promotion portion that is disposed at the tire circumference direction side relative to the floor portion may be changed and this air may be excellently released through the second air entry and exit promotion portion, or the direction of air flowing from the second air entry and exit promotion portion may be changed and this air may be excellently released through the circumference-direction air entry and exit promotion portion.

In a heavy duty tire according to a fifth aspect, in the heavy duty tire according to any one of the first to fourth aspects, an average inclination angle of the slope relative to the tire surface is in a range from 5° to 45°.

If the average inclination angle of the slope relative to the tire surface is greater than 45°, changing the direction of air flowing along the tire surface so as to flow along the slope is problematic. On the other hand, if the average inclination angle of the slope relative to the tire surface is less than 5°, the effect of cooling is reduced. It is preferable if the average inclination angle of the slope relative to the tire surface is set in a range from 5° to 30°, and even more preferable if the average inclination angle of the slope relative to the tire surface is in a range from 15° to 25°.

In a heavy duty tire according to a sixth aspect, a tire width direction end portion of a belt ply having the greatest width in a tire width direction among belt plies structuring a belt, is disposed at a tire width direction inner side of the floor portion.

When the heavy duty tire is rotating, because of a tread repeatedly making contact with and separating from the road surface, warping occurs in the vicinity of the end portion of the belt ply having the greatest width in the tire width direction. Therefore, the temperature of, in particular, the vicinity of the end portion of the belt ply with the greatest width in the tire width direction rises.

In the heavy duty tire according to the sixth aspect, because the tire width direction end portion of the belt ply structuring the belt that has the greatest width in the tire width direction is disposed at the tire width direction inner side of the floor portion of the recess portion, heat that is generated in the vicinity of the end portion of this belt ply may be effectively released out of the tire through the recess portion. Thus, a temperature rise of the vicinity of the tire width direction end portion of the belt ply having the greatest width in the tire width direction may be suppressed.

Advantageous Effects of Invention

According to the heavy duty tire of the present invention as described above, an excellent effect is provided in that cooling performance of a buttress portion may be improved.

BRIEF DESCRIPTION OF DRAWINGS

FIG. 2 is a side view showing the buttress portion vicinity of the heavy duty tire according to the exemplary embodiment of the present invention.

FIG. 3 is a perspective view showing the buttress portion vicinity of the heavy duty tire according to the exemplary embodiment of the present invention.

FIG. 4 is a plan view showing an air cooling portion provided at the buttress portion.

DETAILED DESCRIPTION

A heavy duty tire 10 according to an exemplary embodiment of the present invention is described using FIG. 1 to FIG. 5. The heavy duty tire 10 according to the present exemplary embodiment has a similar structure to a common heavy duty pneumatic tire apart from air cooling portions 32, which are described below.

Figure 1:
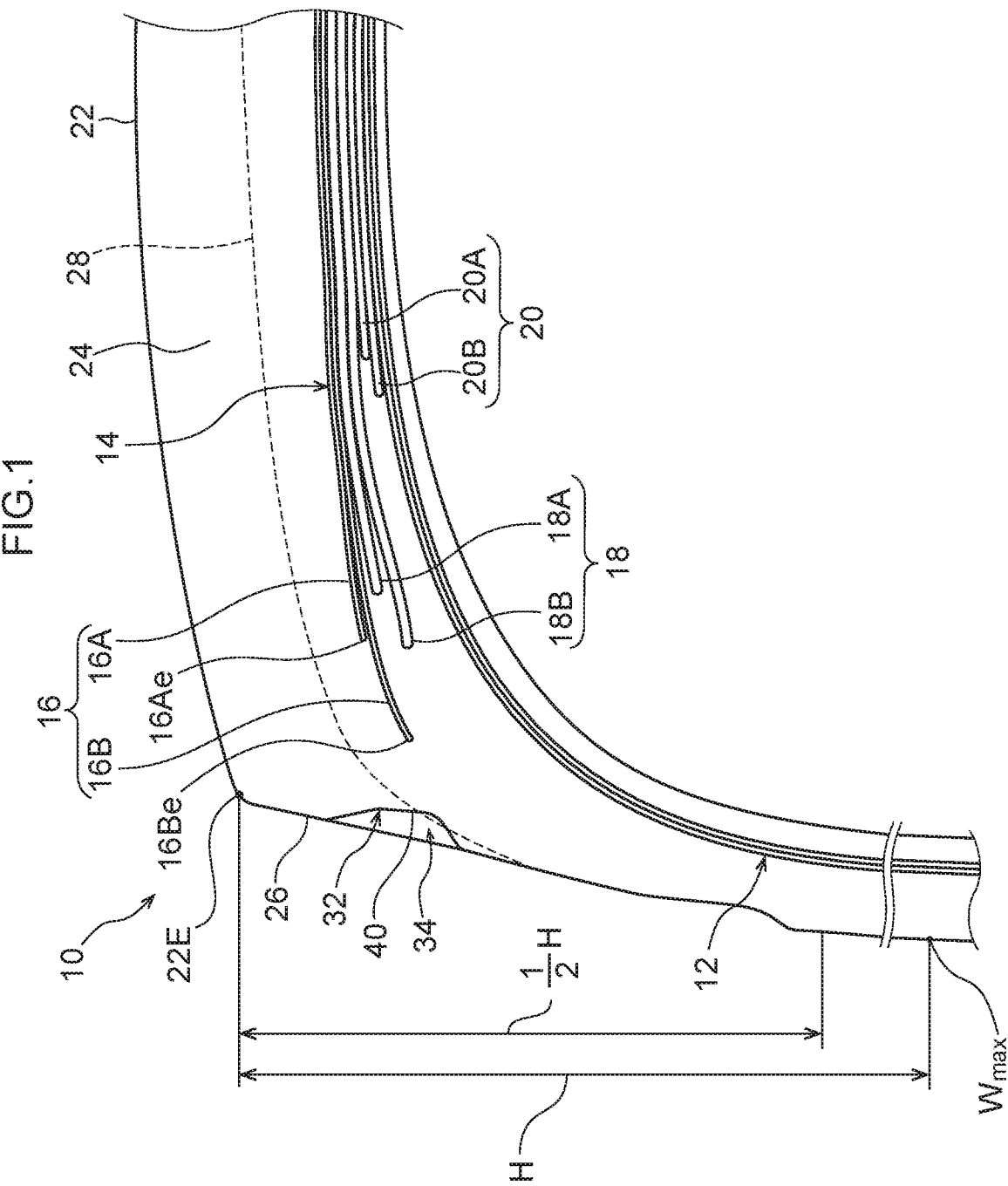
FIG. 1 is a sectional view showing a buttress portion vicinity of a heavy duty tire according to an exemplary embodiment of the present invention.

As shown in FIG. 1, the heavy duty tire 10 is provided with a carcass 12 that spans between a pair of bead cores, which are not shown in the drawings.

Belt Structure

A belt 14 is disposed at a tire diameter direction outer side of the carcass 12. The belt 14 is provided with plural belt layers. More specifically, the heavy duty tire 10 according to the present exemplary embodiment is provided with a protective belt layer 16 formed of two protective belts 16A and 16B, a main interlace belt layer 18 formed of two main interlace belts 18A and 18B, and a small interlace belt layer 20 formed of two small interlace belts 20A and 20B. The protective belts 16A and 16B, main interlace belts 18A and 18B, and small interlace belt layers 20A and 20B each have common structures in which plural cords that are arrayed in parallel with one another are coated with coating rubber.

The main interlace belt layer 18 is disposed at the tire diameter direction outer side of the small interlace belt layer 20, and the protective belt layer 16 is disposed at the tire diameter direction outer side of the main interlace belt layer 18.

In the heavy duty tire 10 according to the present exemplary embodiment, as an example, an angle that the cords structuring the small interlace belt layer 20 form with the tire circumference direction is from 4° to 10°, an angle that the cords structuring the main interlace belt layer 18 form with the tire circumference direction is from 18° to 35°, and an angle that the cords structuring the protective belt layer 16 form with the tire circumference direction is from 22° to 33°.

Below, widths of the belt layers of the belt 14 according to the present exemplary embodiment are described.

The small interlace belt 20B is at the innermost side in the tire diameter direction. The small interlace belt 20A is adjacent at the tire diameter direction outer side of the small interlace belt 20B. The small interlace belt 20A is formed with a width slightly smaller than a width of the small interlace belt 20B.

The main interlace belt 18B is adjacent at the tire diameter direction outer side of the small interlace belt 20A. The interlace belt 18B is formed with a width greater than the widths of the small interlace belts 20A and 20B.

The main interlace belt 18A is adjacent at the tire diameter direction outer side of the main interlace belt 18B. The main interlace belt 18A is formed with a width greater than the widths of the small interlace belts 20A and 20B but smaller than the width of the main interlace belt 18B.

The protective belt 16B is adjacent at the tire diameter direction outer side of the main interlace belt 18A. The protective belt 16B is formed with a width greater than the widths of the small interlace belts 20A and 20B and the main interlace belts 18A and 18B.

The protective belt 16A, which is adjacent at the tire diameter direction outer side of the protective belt 16B, is disposed at the outermost side of the belt 14 in the tire diameter direction. The protective belt 16A is formed with a width smaller than the widths of the protective belt 16B and the main interlace belt 18B but greater than the widths of the small interlace belts 20A and 20B and the main interlace belt 18A. Of the plural belt layers, the protective belt 16A is disposed furthest to the outer side in the tire diameter direction.

Counting from the diameter direction inner side of the belt 14, the protective belt 16B is the fifth belt layer. Of the plural belt layers, the protective belt 16B is formed with the greatest width. Thus, belt end portions of the protective belt 16B are disposed furthest to tire width direction outer sides. The protective belt 16B is an example of a belt ply with the greatest width in the tire width direction.

A tread rubber 24 that structures a tread 22 is disposed at the tire diameter direction outer side of the belt 14. The tread rubber 24 extends along the carcass 12 to the outer sides of the belt 14 in the tire width direction. Portions of the tread rubber 24 that are disposed at the outer sides of the belt 14 in the tire width direction structure portions of buttress portions 26.

The meaning of the term "buttress portion 26" in the present exemplary embodiment is intended to include, if the symbol H represents a tire diameter direction dimension between a tire maximum width portion Wmax and a contact patch end 22E of the tread 22, a region between the contact patch end 22E and a position ½×H from the tire maximum width portion Wmax.

The contact patch ends 22E of the tread 22 are regions that are loaded with a maximum load performance when the heavy duty tire 10 is mounted to a standard rim complying with the JATMA YEAR BOOK (from the Japan Automobile Tire Manufacturers Association, 2017 edition) and charged with air pressure to 100% of an air pressure (a maximum air pressure) corresponding with the maximum load performance (the bold-text load in the table of internal pressure against load performance) in the JATMA YEAR BOOK for the employed size and ply rating. A usage ground or fabrication ground complies with the respective standards when the TRA (Tire and Rim Association) standards and the ETRTO (European Tyre and Rim Technical Organisation) standards are applied.

Plural lug grooves 28 are formed in the tire circumference direction in the tread 22 of the heavy duty tire 10. The lug grooves 28 formed in the tread 22 extend further to the tire width direction outer sides than each contact patch end 22E of the tread 22. As shown in FIG. 2, end portions of the lug grooves 28 open out in the buttress portion 26 of the heavy duty tire 10. In the present exemplary embodiment, a land region between one of the lug grooves 28 and an adjacent one of the lug grooves 28 in the tire circumference direction is referred to as a lug block 30.

As shown in FIG. 1 to FIG. 3, the air cooling portions 32 are formed in the buttress portion 26 in recess shapes. In the present exemplary embodiment, the air cooling portions 32 are formed (in the buttress portion 26) in side faces of the lug blocks 30 that are set apart by the lug grooves 28.

Details of the Air Cooling Portion

As shown in FIG. 4, each air cooling portion 32 includes a recess portion 34, a circumference-direction air entry and exit promotion portion 36 disposed adjacent to the recess portion 34, and a diameter-direction air entry and exit promotion portion 38.

Details of the Recess Portion

First, the recess portion 34 is described.

As shown in FIG. 1 to FIG. 3, the recess portion 34 is formed in the buttress portion 26 and opens to the tire outer side. As shown in FIG. 4, the recess portion 34 is provided with a floor portion 40 that, in a plan view seen in the tire axial direction, forms a trapezoid shape of which a bottom edge 40A at the tire diameter direction outer side (the side in the direction of arrow A) is wider than a top edge 40B at the tire diameter direction inner side. The bottom edge 40A and top edge 40B are parallel with a tangential direction of the tire circumference direction (the direction of arrow B). An edge 40C at a front side of the floor portion 40 in a tire rotation direction (the direction of arrow B) and an edge 40D at the side of the floor portion 40 in the opposite direction to the tire rotation direction are inclined relative to the tire diameter direction (the direction of arrow A).

In the present exemplary embodiment, the floor portion 40 has a trapezoid shape. However, the floor portion 40 may have a square shape, a rectangular shape, a triangular shape or an alternative polygonal shape, and may have a circular or ellipsoid shape.

Figure 5A:
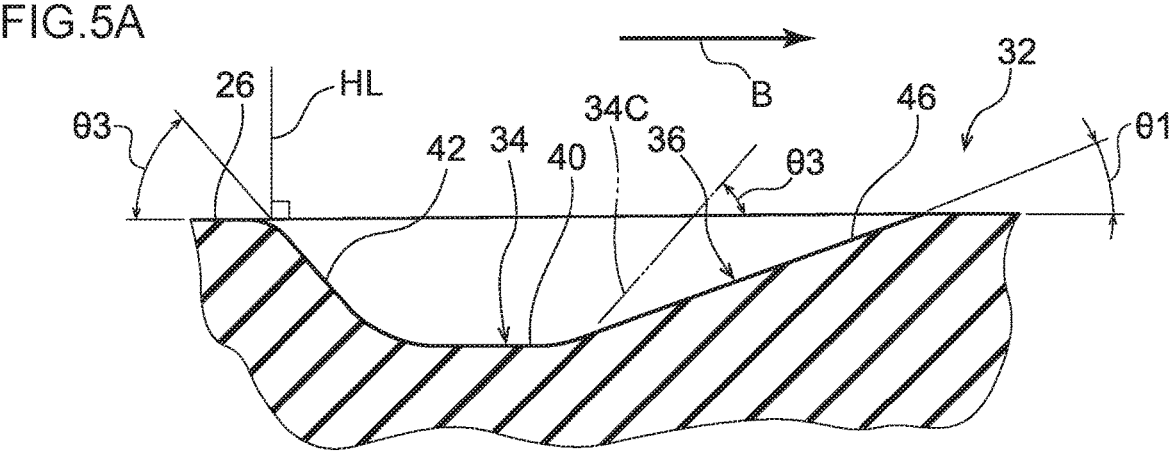
FIG. 5A is a sectional view, cut along line 5A-5A, of the air cooling portion shown in FIG. 4.
Figure 5B:
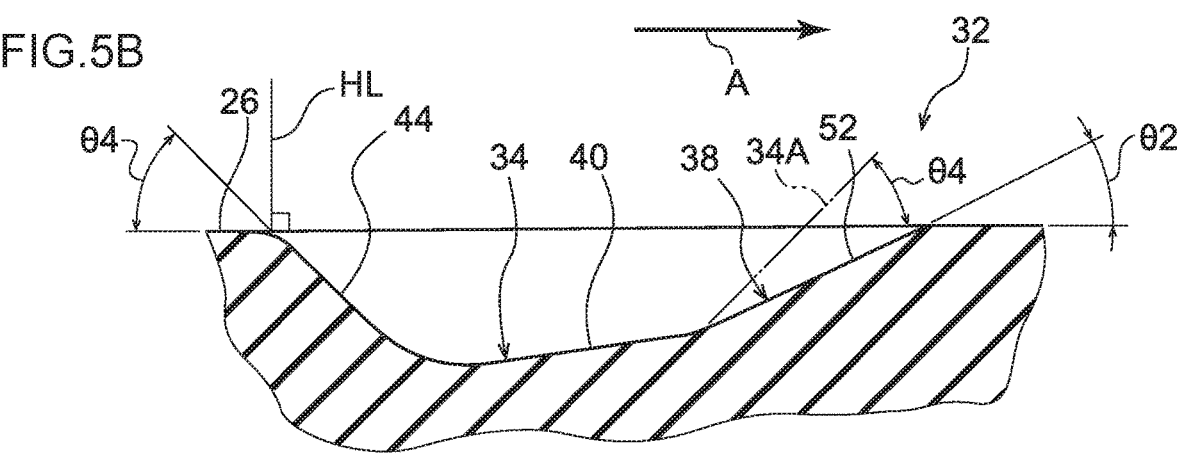
FIG. 5B is a sectional view, cut along line 5B-5B, of the air cooling portion shown in FIG. 4.

As shown in FIG. 5A, a depth of the floor portion 40 is constant along the tire rotation direction (the direction of arrow B). As shown in FIG. 5B, the depth of the floor portion 40 is inclined to become steadily shallower from the tire diameter direction inner side toward the tire diameter direction outer side (the side in the direction of arrow A). However, the floor portion 40 may be inclined in the direction along the tire rotation direction (the direction of arrow B), and the depth of the floor portion 40 may be constant in the direction along the tire diameter direction (arrow A).

As shown in FIG. 1, in the recess portion 34 according to the present exemplary embodiment, the floor portion 40 is disposed at the tire width direction outer side of a tire width direction end portion 16Be of the protective belt 16B that is formed with the greatest width in the belt 14. In the present exemplary embodiment, the tire width direction end portion 16Be of the protective belt 16B is disposed at the tire width direction inner side of a tire diameter direction central portion of the recess portion 34. More specifically, the tire width direction end portion 16Be is disposed between the bottom edge 40A and the top edge 40B of the floor portion 40 (see FIG. 4), at the side therebetween that is closer to the top edge 40B.

As shown in FIG. 4, a recess portion side wall 42 is formed at the opposite side from the front side of the floor portion 40 in the tire rotation direction (the direction of arrow B). The recess portion side wall 42 serves as an air-catching wall portion structuring a portion of the recess portion 34. The recess portion side wall 42 is formed at the opposite side of the floor portion 40 from the side thereof at which the circumference-direction air entry and exit promotion portion 36 that is described below is formed. A recess portion side wall 44 structuring another portion of the recess portion 34 is formed at the tire diameter direction inner side (the opposite direction from the direction of arrow A) of the floor portion 40. The recess portion side wall 44 is formed at the opposite side of the floor portion 40 from the side thereof at which the diameter-direction air entry and exit promotion portion 38 that is described below is formed. As shown in FIG. 5A and FIG. 5B, the recess portion 34 is demarcated by a surface 34A and a surface 34C. The surface 34A rises up from the bottom edge 40A at an angle θ4 that is substantially the same as an angle between the recess portion side wall 44 and the tire surface. The surface 34C is at an angle θ3 that is substantially the same as an angle between the recess portion side wall 42 and the tire surface. It is preferable if θ3 and θ4 are greater than 40°. Moreover, θ3 and θ4 are greater than inclination angles of slopes 46 and 52, which are described below.

Cross sections of the recess portion side wall 44 and the recess portion side wall 42 are formed in curved shapes at boundary regions with the surface of the buttress portion 26. Therefore, warping of the buttress portion 26 by loads may be suppressed.

As shown in FIG. 5A, the recess portion side wall 42 is inclined relative to a normal line HL standing perpendicular to the surface of the buttress portion 26. As shown in FIG. 5B, the recess portion side wall 44 is also inclined relative to the normal line HL standing perpendicular to the surface of the buttress portion 26. Thus, the recess portion 34 is formed so as to widen toward the tire outer side from the floor portion 40.

Circumference-Direction Air Entry and Exit Promotion Portion

Now, the circumference-direction air entry and exit promotion portion 36 is described. As shown in FIG. 4 and FIG. 5A, the circumference-direction air entry and exit promotion portion 36 is disposed at the front side in the tire rotation direction (the direction of arrow B) relative to the floor portion 40 of the recess portion 34. The circumference-direction air entry and exit promotion portion 36 forms a trapezoid shape in a plan view, and is a recess-shaped region that includes the slope 46. The slope 46 inclines toward the floor portion 40 of the recess portion 34 from the surface of the buttress portion 26 at the tire rotation direction front side (the side in the direction of arrow B) of the recess portion 34. The slope 46 smoothly joins to the floor portion 40. The slope 46 is an inclined surface that gradually decreases in depth from the tire surface in the direction from the floor portion 40 toward the tire surface.

In the present exemplary embodiment, an example in which the slope 46 has a trapezoid shape in plan view is described, but the slope 46 may be formed in an alternative polygonal shape in plan view, depending on the inclination direction of the floor portion 40 (and a direction of extension of the edge 40C) and the surface shape of the buttress portion 26.

A side wall 48 is formed at the tire diameter direction outer side (the side in the direction of arrow A) of the slope 46. The side wall 48 is more steeply inclined than the slope 46. A side wall 50 is formed at the tire diameter direction inner side of the slope 46. The side wall 50 is more steeply inclined than the slope 46. An angle of the side wall 48 relative to the slope 46 is greater than an angle of the side wall 50 relative to the slope 46.

As shown in FIG. 4, a width of the circumference-direction air entry and exit promotion portion 36 gradually increases from the tire rotation direction front side thereof toward the side thereof at which the recess portion 34 is disposed. In other words, if a width of an end portion of the circumference-direction air entry and exit promotion portion 36 at the tire rotation direction front side is represented by W1, and a width of the circumference-direction air entry and exit promotion portion 36 at the side at which the recess portion 34 is disposed (a width of a region of the tire surface that joins with the recess portion 34, measured in the tire diameter direction) is represented by W3, then W3>W1. The width of the slope 46 is constant; tire diametric direction widths of the side walls 48 and 50 gradually increase from the tire rotation direction front sides thereof to the sides thereof at which the recess portion 34 is disposed. However, the width of the circumference-direction air entry and exit promotion portion 36 may be constant from the tire rotation direction front side toward the side at which the recess portion 34 is disposed.

In the present exemplary embodiment, the width W3 of the circumference-direction air entry and exit promotion portion 36 at the tire surface at the side at which the recess portion 34 is disposed is specified to be the same as a width W2 (in the tire diameter direction) of the recess portion 34 at the tire surface. The two-dot chain lines (imaginary lines) in FIG. 4 show what an opening portion of the recess portion 34 would be if the circumference-direction air entry and exit promotion portion 36 and the diameter-direction air entry and exit promotion portion 38 described below were not formed.

As shown in FIG. 5A and FIG. 5B, the slope 46 is inclined more gently than the recess portion side wall 42 and recess portion side wall 44 of the recess portion 34. An average inclination angle θ1 of the slope 46 relative to the tire surface of the buttress portion 26 is preferably within a range from 5° to 45°. If this average inclination angle θ1 is greater than 45°, changing the direction of air flowing along the tire surface so as to flow along the slope 46 is problematic. On the other hand, if the average inclination angle of the slope 46 relative to the tire surface is less than 5°, the effect of cooling is reduced. This inclination angle θ1 is more preferably set in a range from 5° to 30°, and is even more preferably set in a range from 15 to 25°.

A cross section of the slope 46 has a linear shape from the edge 40C to the surface of the buttress portion 26. Because the slope 46 is formed in this linear shape, the inclination angle of the slope 46 is constant, and a direction of flow of air may more easily be made to follow the slope 46.

Diameter-Direction Air Entry and Exit Promotion Portion

Now, the diameter direction air entry and exit promotion portion 38 is described.

As shown in FIG. 4, the diameter-direction air entry and exit promotion portion 38 is disposed at the tire diameter direction outer side (the direction of arrow A) of the recess portion 34. Seen in a sectional view as shown in FIG. 5B, the diameter-direction air entry and exit promotion portion 38 is a recess-shaped region that includes the slope 52. The slope 52 inclines toward the floor portion 40 of the recess portion 34 from the surface of the buttress portion 26, and forms a substantially square shape in plan view. The slope 52 smoothly joins with the floor portion 40. The slope 52 is an inclined surface that gradually decreases in depth from the tire surface in the direction from the floor portion 40 toward the tire surface.

In the present exemplary embodiment the slope 52 has a substantially square shape, but the slope 52 may have a rectangular shape, a trapezoid shape or an alternative polygonal shape.

As shown in FIG. 4, a side wall 54 is formed at the tire rotation direction front side (the side in the direction of arrow B) of the slope 52. The side wall 54 is more steeply inclined than the slope 52. A side wall 56 is formed at the opposite side of the slope 52 from the tire rotation direction front side thereof. The side wall 56 is more steeply inclined than the slope 52. Angles of the side walls 54 and 56 relative to the slope 52 are of substantially the same magnitude. The diameter-direction air entry and exit promotion portion 38 according to the present exemplary embodiment is formed with a width dimension (a dimension in a direction orthogonal to the inclination direction of the slope 52) at the tire diameter direction outer side thereof that is relatively small compared to the width dimension at the side thereof at which the recess portion 34 is disposed. A minimum distance of the slope 52 from the bottom edge 40A to the surface of the buttress portion 26 is longer than a minimum distance of the recess portion side wall 44 from the top edge 40B to the surface of the buttress portion 26.

However, the width of the slope 52 may be constant from the floor portion 40 of the recess portion 34 to the tire diameter direction outer side.

End portions of the side wall 54 of the diameter-direction air entry and exit promotion portion 38 and the side wall 48 of the circumference-direction air entry and exit promotion portion 36 described above join with one another. Further, end portions of the side wall 50 of the circumference-direction air entry and exit promotion portion 36 and the recess portion side wall 44 of the recess portion 34 join with one another.

The slope 52 is inclined more gently than the recess portion side wall 42 and recess portion side wall 44 of the recess portion 34. As shown in FIG. 5B, similarly to the average inclination angle θ1 of the slope 46 of the circumference-direction air entry and exit promotion portion 36, an average inclination angle θ2 of the slope 52 relative to the surface of the buttress portion 26 is preferably within a range from 5° to 45°, is more preferably within a range from 5° to 30°, and is even more preferably within a range from 15 to 25°.

A cross section of the slope 52 has a linear shape from the bottom edge 40A to the surface of the buttress portion 26. Because the slope 52 is formed in this linear shape, the inclination angle of the slope 52 may be constant, and a direction of flow of air in or out may more easily be made to follow the slope 52.

Figure 5C:
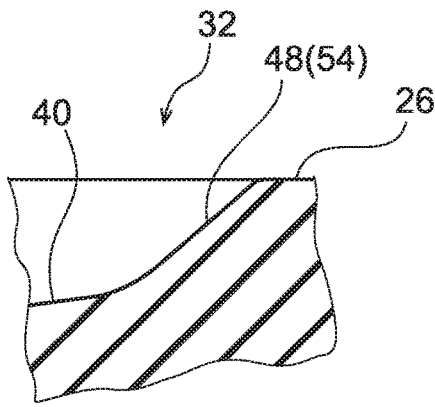
FIG. 5C is a sectional view, cut along line 5C-5C, of the air cooling portion shown in FIG. 4.

As shown in FIG. 5A and FIG. 5B, the average inclination angle θ1 of the slope 46 and the average inclination angle θ2 of the slope 52 are smaller than an average inclination angle θ3 of the recess portion side wall 42 of the recess portion 34 and an average inclination angle θ4 of the recess portion side wall 44. FIG. 5C is a sectional view, cut along line 5C-5C, of the air cooling portion shown in FIG. 4. A minimum distance of the slope 46 from the edge 40C to the surface of the buttress portion 26 is longer than a minimum distance of the recess portion side wall 42 from the edge 40D to the surface of the buttress portion 26.

As shown in FIG. 4, in the air cooling portion 32 according to the present exemplary embodiment, an end portion of the slope 46 of the circumference-direction air entry and exit promotion portion 36 at the side thereof at which the recess portion 34 is disposed connects along the whole length of the edge 40C with the tire rotation direction front side of the floor portion 40 of the recess portion 34. Further, an end portion of the slope 52 of the diameter-direction air entry and exit promotion portion 38 at the side thereof at which the recess portion 34 is disposed connects along the whole length of the bottom edge 40A with the tire diameter direction outer side of the floor portion 40 of the recess portion 34.

Operation and Effects

Now, operation and effects of the heavy duty tire 10 according to the present exemplary embodiment are described.

When the heavy duty tire 10 rotates due to running, the tread 22 repeatedly makes contact with and separates from a road surface. As a result, the tread 22 repeatedly warps, and the buttress portion 26 in particular generates large amounts of heat.

When the heavy duty tire 10 rotates due to running, a speed difference occurs between the tire surface and the surrounding air, and the air flows into the recess portions 34 of the air cooling portions 32 formed in the buttress portions 26. More specifically, air at the tire rotation direction front side of each air cooling portion 32 flows into the recess portion 34 via the circumference-direction air entry and exit promotion portion 36 at the tire rotation direction front side thereof, as illustrated by arrow C in FIG. 3. The air flowing into the recess portion 34 flows along the floor portion 40 of the recess portion 34 and cools the floor portion 40 of the recess portion 34.

The average inclination angle θ1 of the slope 46 of the circumference-direction air entry and exit promotion portion 36 relative to the tire surface is not more than 45°, the slope 46 is inclined more gently than the recess portion side wall 42 and recess portion side wall 44 of the recess portion 34, and the slope 46 joins with the floor portion 40 of the recess portion 34. Therefore, particularly air at the tire rotation direction front side of the recess portion 34 may be smoothly guided along the slope 46 to the interior of the recess portion 34. Because the air flowing into the recess portion 34 flows along the floor portion 40 of the recess portion 34, the floor portion 40 may be cooled effectively. That is, the air cooling portion 32 that is provided with the circumference-direction air entry and exit promotion portion 36 facilitates inflows of air into the recess portion 34 and the buttress portion 26 may be cooled more effectively than in a structure without the circumference-direction air entry and exit promotion portion 36.

The air flowing along the floor portion 40 may come up against the recess portion side wall 42 and form turbulence. Therefore, a case of air that flows from the circumference-direction air entry and exit promotion portion 36 only passing along the surface of the recess portion 34 and escaping may be suppressed, and trapping of air at the floor portion 40 may be suppressed. As a result, the effect of cooling the floor portion of the recess portion 34 may be improved.

The air flowing into the floor portion 40 is released out of the tire along the slope 52 of the diameter-direction air entry and exit promotion portion 38 that is disposed at the tire diameter direction outer side of the recess portion 34. That is, the direction of flow of the air flowing in from the tire rotation direction front side is changed by the floor portion 40 and the air is released to the tire outer side. Therefore, in the air cooling portion 32, flows of air in and out of the recess portion 34 are facilitated and the buttress portion 26 may be cooled more effectively than in a structure without the diameter-direction air entry and exit promotion portion 38.

When the diameter-direction air entry and exit promotion portion 38 at the tire diameter direction outer side of the recess portion 34 is disposed at the tire progress direction front side of the recess portion 34, a flow of air (progress wind) toward the rear of the tire progress direction may be facilitated, from the diameter-direction air entry and exit promotion portion 38 toward the floor portion 40 of the recess portion 34.

If the average inclination angle θ1 of the slope 46 of the circumference-direction air entry and exit promotion portion 36 is greater than 45°, changing the direction of air flowing along the tire surface so as to follow the slope 46 is problematic. On the other hand, if the average inclination angle θ1 of the slope 46 of the circumference-direction air entry and exit promotion portion 36 is smaller than 5°, the effect of cooling the recess portion 34 is reduced. The same considerations apply to the average inclination angle θ2 of the slope 52 of the diameter-direction air entry and exit promotion portion 38.

As shown in FIG. 4, in the air cooling portion 32 according to the present exemplary embodiment, an end portion of the slope 46 of the circumference-direction air entry and exit promotion portion 36 at the side thereof at which the recess portion 34 is disposed connects along the whole length of the edge 40C with the tire rotation direction front side of the floor portion 40 of the recess portion 34. Further, an end portion of the slope 52 of the diameter-direction air entry and exit promotion portion 38 at the side thereof at which the recess portion 34 is disposed connects along the whole length of the bottom edge 40A with the tire diameter direction outer side of the floor portion 40 of the recess portion 34. Therefore, air flowing in through the circumference-direction air entry and exit promotion portion 36 may flow over the whole of the width direction of the floor portion 40 of the recess portion 34 and may flow out through the diameter-direction air entry and exit promotion portion 38. Thus, the floor portion 40 may be cooled effectively, and air may flow in through the diameter-direction air entry and exit promotion portion 38 efficiently.

When the heavy duty tire 10 is rotating, the tread 22 tends to rise in temperature in the vicinity of the maximum width of the belt 14, that is, the vicinity of the tire width direction end portion 16Be of the protective belt 16B that is formed with the greatest width among the structures of the belt 14.

In the present exemplary embodiment, the floor portion 40 of the recess portion 34 of each air cooling portion 32 is disposed at the tire width direction outer side of the tire width direction end portion 16Be of the protective belt 16B, and thus is disposed in the vicinity of the tire width direction end portion 16Be of the protective belt 16B that is most susceptible to rising in temperature. Therefore, heat generated in the vicinity of the tire width direction end portion 16Be of the protective belt 16B may be effectively released out of the tire through the floor portion 40 of the recess portion 34, and a temperature rise of the vicinity of the tire width direction end portion 16Be of the protective belt 16B with the greatest width may be suppressed effectively.

In the heavy duty tire 10 according to the present exemplary embodiment, the tire width direction end portion 16Be of the protective belt 16B is disposed at the tire width direction inner side of a tire diameter direction central portion of the floor portion 40 of the recess portion 34. Therefore, a tire diameter direction inner side region and a tire diameter direction outer side region of the tire width direction end portion 16Be may be cooled equally.

In the example in FIG. 1, the floor portion 40 of the recess portion 34 is not disposed at the tire width direction outer side of a tire width direction end 16Ae of the protective belt 16A that is disposed at the outermost side of the belt 14 in the tire diameter direction. However, the floor portion 40 may be extended to the tire diameter direction outer side. Thus, the floor portion 40 of the recess portion 34 may be disposed at the tire width direction outer side of the tire width direction end 16Ae of the protective belt 16A that is at the outermost side.

When the heavy duty tire 10 is running on a bad road or the like, cracks may form in the surface of the tread 22. When heat is generated in a vicinity of the tire width direction end 16Ae of the protective belt 16A at the tire width direction outermost side, and the temperature of the vicinity of the tire width direction end 16Ae rises, durability of the tread rubber 24 surrounding the vicinity of the tire width direction end 16Ae may be reduced, and cracks formed in the surface of the tread 22 may advance into rubber regions with reduced durability.

When the floor portion 40 of the recess portion 34 is disposed at the tire width direction outer side of the tire width direction end 16Ae of the protective belt 16A at the tire diameter direction outermost side, the floor portion 40 may be brought closer to the tire width direction end 16Ae. As a result, temperature rises of the vicinity of the tire width direction end 16Ae may be suppressed, durability of the tread rubber 24 in the vicinity of the tire width direction end 16Ae may be maintained, and a case of cracks in the surface of the tread 22 advancing into the tread rubber 24 in the vicinity of the tire width direction end 16Ae may be suppressed.

ALTERNATIVE EMBODIMENTS

Hereabove, an exemplary embodiment of the present invention has been described. The present invention is not limited by these descriptions and it will be clear that numerous modifications beyond these descriptions may be embodied within a technical scope not departing from the gist of the invention.

Below, variant examples are described in which positional relationships and the like of the circumference-direction air entry and exit promotion portion, the diameter-direction air entry and exit promotion portion and the recess portion 34 are changed. FIG. 6A to FIG. 6C and FIG. 7A to FIG. 7D are plan views schematically showing the variant examples of the air cooling portion 32. Only the floor portion of the recess portion 34 and the slopes of the circumference-direction air entry and exit promotion portion and the diameter-direction air entry and exit promotion portion are described.

Figure 6A:
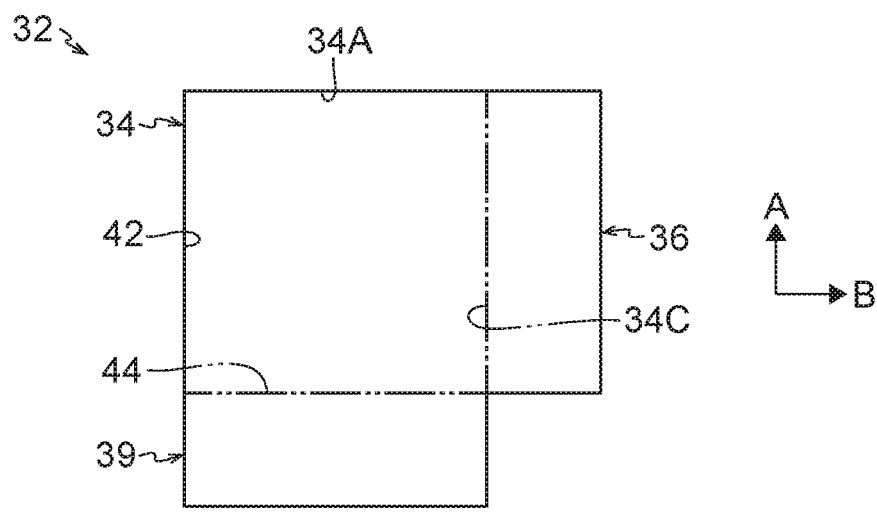
FIG. 6A is a plan view showing a variant example of the air cooling portion.
Figure 6B:
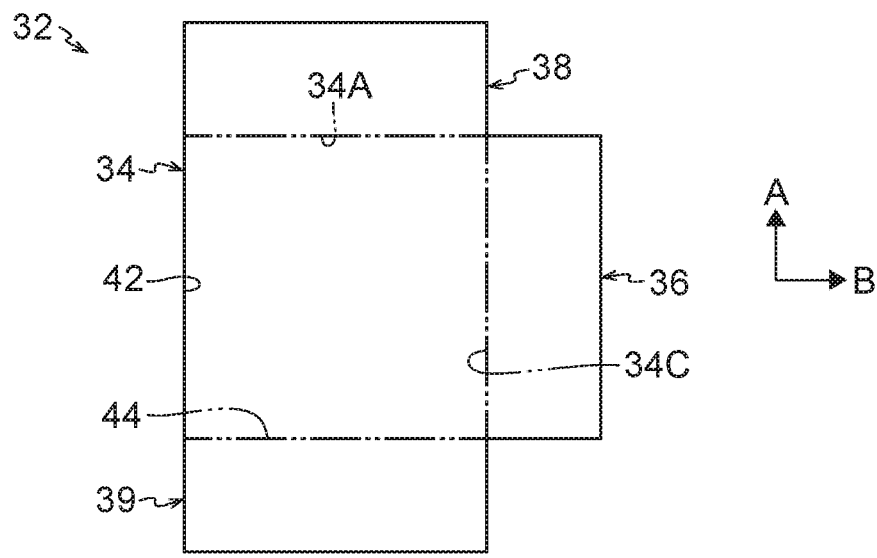
FIG. 6B is a plan view showing a variant example of the air cooling portion.
Figure 6C:
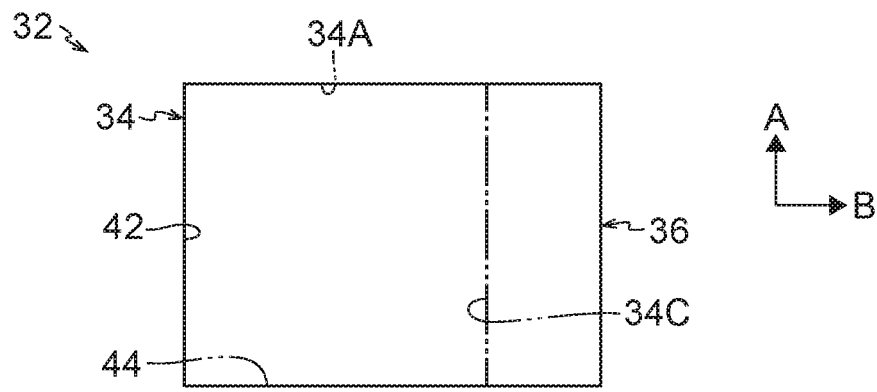
FIG. 6C is a plan view showing a variant example of the air cooling portion.

In the examples shown in FIG. 6A to FIG. 6C, the circumference-direction air entry and exit promotion portion 36 is formed at the tire circumference direction front side of the recess portion 34, and the recess portion side wall 42 that serves as the air-catching wall portion is formed at the tire circumference direction rear side of the recess portion 34.

In the example shown in FIG. 6A, in addition to the above, a diameter-direction air entry and exit promotion portion 39 is formed at the tire diameter direction inner side of the recess portion 34. The recess portion side wall 44 becomes an imaginary wall face. At the tire diameter direction outer side of the recess portion 34, a recess portion side wall 34A is formed in a region in which the imaginary surface 34A is disposed.

In the example shown in FIG. 6B, in addition to the structure of FIG. 6A, the diameter-direction air entry and exit promotion portion 38 is formed at the tire diameter direction outer side of the recess portion 34. The recess portion side wall 34A becomes an imaginary wall face.

In the example shown in FIG. 6C, the circumference-direction air entry and exit promotion portion 36 is formed at the tire circumference direction front side of the recess portion 34, and the recess portion side wall 42 is formed at the tire circumference direction rear side of the recess portion 34. No other air entry and exit promotion portions are formed.

In the examples shown in FIG. 7A to FIG. 7D, a circumference-direction air entry and exit promotion portion 37 is formed at the tire circumference direction rear side of the recess portion 34, and a recess portion side wall 34C that serves as an air-catching wall portion is formed at the tire circumference direction front side of the recess portion 34.

Figure 7A:
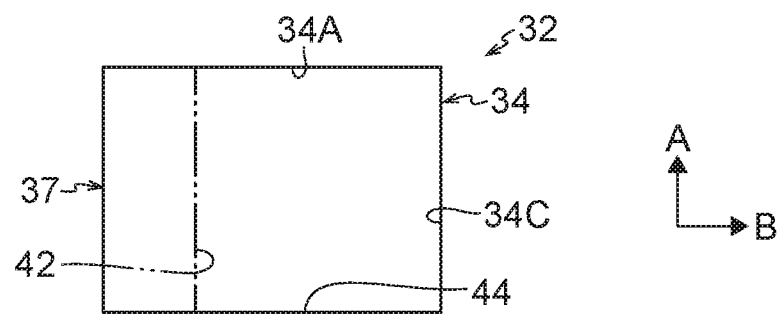
FIG. 7A is a plan view showing another variant example of the air cooling portion.

In the example shown in FIG. 7A, no air entry and exit promotion portion apart from the one described above is formed.

Figure 7B:
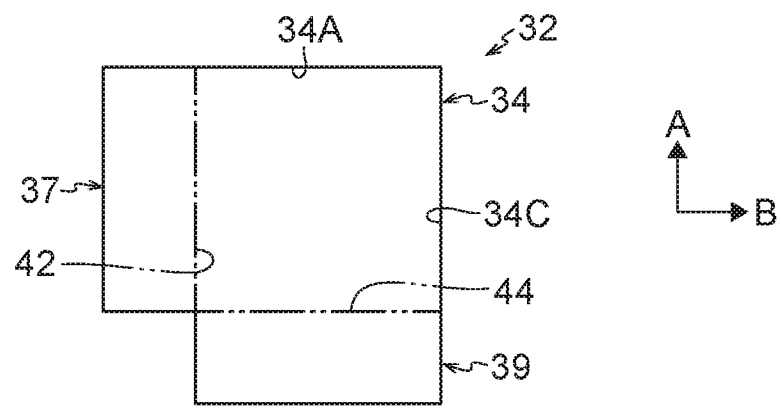
FIG. 7B is a plan view showing another variant example of the air cooling portion.

In the example shown in FIG. 7B, in addition to FIG. 7A, the diameter-direction air entry and exit promotion portion 39 is formed at the tire diameter direction inner side of the recess portion 34. The recess portion side wall 44 becomes an imaginary wall face.

Figure 7C:
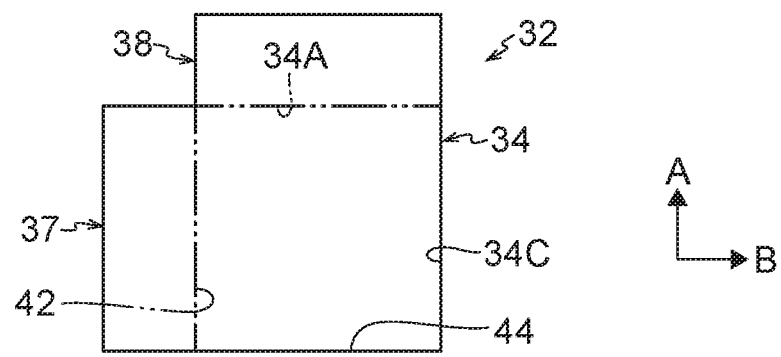
FIG. 7C is a plan view showing another variant example of the air cooling portion.

In the example shown in FIG. 7C, in addition to FIG. 7A, the diameter-direction air entry and exit promotion portion 38 is formed at the tire diameter direction outer side of the recess portion 34. The recess portion side wall 42 becomes an imaginary wall face.

Figure 7D:
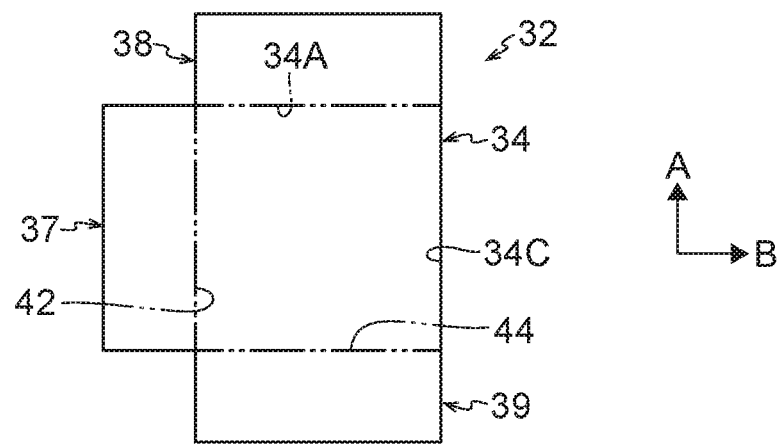
FIG. 7D is a plan view showing another variant example of the air cooling portion.

In the example shown in FIG. 7D, in addition to FIG. 7C, the diameter-direction air entry and exit promotion portion 39 is formed at the tire diameter direction inner side of the recess portion 34.

The disclosures of Japanese Patent Application No. 2017-237698 filed Dec. 12, 2017 are incorporated into the present specification by reference in their entirety. All references, patent applications and technical specifications cited in the present specification are incorporated by reference into the present specification to the same extent as if the individual references, patent applications and technical specifications were specifically and individually recited as being incorporated by reference.

The invention claimed is:

1. A heavy duty tire comprising:
   a recess portion formed in a buttress portion, the recess portion opening toward a tire outer side and including a floor portion;
   a circumference-direction air entry and exit promotion portion disposed at one side in a tire rotation direction relative to the floor portion, the circumference-direction air entry and exit promotion portion including a slope that, from the floor portion toward a tire surface, gradually decreases in depth from the tire surface, and the circumference-direction air entry and exit promotion portion facilitating access of air toward the floor portion;
   an air-catching wall portion disposed at an opposite side of the floor portion from the one side at which the circumference-direction air entry and exit promotion portion is disposed, an angle of the air-catching wall portion relative to the tire surface being greater than a corresponding angle of the slope; and
   a second air entry and exit promotion portion disposed at a different location from the circumference-direction air entry and exit promotion portion, the second air entry and exit promotion portion including a slope that, from the floor portion toward the tire surface, gradually decreases in depth from the tire surface, and an angle of the slope of the second air entry and exit promotion portion relative to the tire surface being smaller than a corresponding angle of the air-catching wall portion.

2. The heavy duty tire according to claim 1, wherein a tire width direction end portion of a belt ply having the greatest width in a tire width direction, among belt plies structuring a belt, is disposed at a tire width direction inner side of the floor portion.

3. The heavy duty tire according to claim 1, wherein an average inclination angle of the slope relative to the tire surface is in a range from 5° to 45°.

4. The heavy duty tire according to claim 3, wherein a tire width direction end portion of a belt ply having the greatest width in a tire width direction, among belt plies structuring a belt, is disposed at a tire width direction inner side of the floor portion.

5. The heavy duty tire according to claim 1, wherein the second air entry and exit promotion portion is a diameter-direction air entry and exit promotion portion that is disposed at least at one side in a tire diameter direction relative to the floor portion.

6. The heavy duty tire according to claim 5, wherein an average inclination angle of the slope relative to the tire surface is in a range from 5° to 45°.

7. The heavy duty tire according to claim 5, wherein a tire width direction end portion of a belt ply having the greatest width in a tire width direction, among belt plies structuring a belt, is disposed at a tire width direction inner side of the floor portion.

8. The heavy duty tire according to claim 1, wherein the circumference-direction air entry and exit promotion portion is disposed at a front side in the tire rotation direction.

9. The heavy duty tire according to claim 8, wherein an average inclination angle of the slope relative to the tire surface is in a range from 5° to 45°.

10. The heavy duty tire according to claim 8, wherein a tire width direction end portion of a belt ply having the greatest width in a tire width direction, among belt plies structuring a belt, is disposed at a tire width direction inner side of the floor portion.

* * * * *